3,108,969
PROCESS OF MIXING SODIUM TRIPOLYPHOSPHATE AND DICHLOROISOCYANURIC ACID
William F. Symes, Webster Groves, Mo., assignor to Monsanto Chemical Company, St. Louis, Mo., a corporation of Delaware
No Drawing. Filed Dec. 22, 1958, Ser. No. 781,876
2 Claims. (Cl. 252—99)

This invention relates to improvements in the manufacture of dichloroisocyanuric acid (sometimes termed dichlorocyanuric acid or dichloroiminocyanuric acid). More particularly this invention relates to improvements in recovering dichloroisocyanuric acid from an aqueous reaction mass containing same. Additionally, this invention relates to dry, stable free-flowing powdered compositions comprising dichloroisocyanuric acid, a hydrate of sodium dichloroisocyanurate and a sodium acid tripolyphosphate and/or a hydrate thereof, which compositions dissolve rapidly in water to produce clear slightly basic or slightly acidic solutions of strong bleaching, disinfecting and germicidal action.

Recently there has been increased emphasis upon the development of solid bleach formulations containing higher concentrations of available chlorine than can be obtained in liquid concentrates. Most of these formulations are based upon an organic compound containing "positive" or "available" chlorine atoms, that is a compound having one or more chlorine atoms which have replaced one or more acidic hydrogen atoms with the result that the compound will hydrolyze in aqueous solution to yield hypochlorite ion. One of the better known of such compounds is dichloroisocyanuric acid which is available commercially as an anhydrous solid material. Although widely used dichloroisocyanuric acid possesses certain objectionable features, namely, while under normal storage conditions the anhydrous solid slowly decomposes evolving highly noxious chloramine volatiles such as $NH_2Cl$ and $NCl_3$, which decomposition is accelerated when the said anhydrous solid is in admixture with alkaline builders or base salts normally employed in bleaching compositions such as the alkali metal phosphates and the alkali metal sulfates. Although various materials (e.g. sodium silicate, potassium carbonate, silver nitrate, etc.) have been mixed with anhydrous dichloroisocyanuric acid and bleaching formulations containing same for the purpose of overcoming the odor problem, apparently by conversion of the evolved chloramines to inoffensive decomposition products, to date no material has been found which successfully prevents anhydrous solid dichloroisocyanuric acid from continuing to decompose under normal storage conditions.

It is believed that the reason why anhydrous solid dichloroisocyanuric acid decomposes under normal storage conditions is due to nitrogen and chlorine containing decomposition products resulting from the manner in which the acid is processed through to the anhydrous state from an aqueous reaction mixture containing same, which decomposition products further decompose providing the aforementioned objectionable chloramines. Dichloroisocyanuric acid is generally and preferably prepared by introducing gaseous or liquid chlorine to an aqueous solution or dispersion of a di-alkali metal isocyanurate such as disodium isocyanurate or dipotassium isocyanurate, the dichlorocyanuric acid precipitates as it forms, is filtered off, and dried to provide a bone-dry product. This drying operation which requires considerable time and temperatures in the range of 100° C. to 200° C. causes the triazine ring of the dichloroisocyanuric acid product to break down as evidenced by the highly noxious volatiles given off during the drying operation. These volatiles are chloramines such as $NH_2Cl$ and $NCl_3$. This break-down of the product during the drying operation not only lowers the efficiency of the process but provides for an unhealthy and hazardous condition for the operators in the plant. Upon cooling the anhydrous solid dichloroisocyanuric acid to room temperature these objectionable volatiles are still in evidence although not as pronounced as in the drying operation, and, as aforenoted, when this anhydrous product is placed under normal storage conditions it continues to decompose. To date, as aforenoted no one has found means to control or prevent the decomposition of anhydrous solid dichloroisocyanuric acid so produced and while solvent extraction has been suggested in view of the highly reactive nature of dichloroisocyanuric acid such has not proven successful in removing the residual nitrogen and chlorine containing decomposition products characteristic thereof which ultimately provide the aforedescribed objectionable volatiles.

It is an object of this invention to overcome the problem of decomposition of dichloroisocyanuric acid encountered in drying operations employed heretofore. It is a further and particular object of this invention to recover dichloroisocyanuric acid from an aqueous reaction mass containing same in a more convenient, economical and less hazardous manner than that aforedescribed. It is a still further object of this invention to provide a dry, stable free-flowing powdered material having strong bleaching sterilizing and disinfecting properties.

These and other objects which are apparent hereinafter are attained by intimately mixing sodium tripolyphosphate, i.e. $Na_5P_3O_{10}$, and water-wet dichloroisocyanuric acid defined hereinafter until a free-flowing dry powder is obtained, the time of mixing of course varying with the amount of the respective materials, rate of mixing, type of mixer, and the like. With respect to the amount of sodium tripolyphosphate, such can vary between about 6 and about 500 parts by weight per unit weight of water of the water-wet dichloroisocyanuric acid but preferably in the range of about 10 to about 100 parts by weight per unit weight of water of the water-wet dichloroisocyanuric acid. With respect to water-wet dichloroisocyanuric acid which is defined hereinafter the amount of water can vary between about 10 and about 65 parts by weight per 100 parts by weight of dichloroisocyanuric acid (dry basis) but preferably in the range of about 17.5 to about 35 parts by weight per 100 parts by weight of dichloroisocyanuric acid (dry basis).

During the mixing of said materials a slow reaction takes place producing sodium dichloroisocyanurate and a sodium acid tripolyphosphate having the empirical formula:

$$Na_{5-n}H_nP_3O_{10}$$

wherein $n$ is a whole number from 1 to 4, usually 2, in the form of hydrates, the hydrates of sodium dichloroisocyanurate forming preferentially. The reaction continues until all of the water of the water-wet dichloroisocyanuric is converted to water of hydration. In most instances some of the water combines with sodium tripolyphosphate to form the hexahydrate thereof.

By "water-wet dichloroisocyanuric acid" is meant the water-wet solid precipitate which settles out when the appropriate reactants for preparing dichloroisocyanuric acid are brought together and reacted in an aqueous medium. The preferred method of preparing this water-wet solid is to introduce chlorine and an aqueous solution of a di-alkali metal isocyanurate into a reaction zone maintained at a temperature in the range of that just above the freezing point of the solution to about 50° C. in an amount at least equal to the stoichiometric amount of chlorine necessary to replace the alkali metal atoms of said isocyanurate, the rate of addition of said chlorine and said aqueous solution being such as to maintain an acidic pH and preferably a pH below about 4.5. The precipitate so formed is then separated from the bulk of the aqueous supernatant by, for example, filtration, centrifugation, decantation, or the like, and the water-wet material washed free or substantially free of alkali metal chloride byproduct with water providing the water-wet dichloroisocyanuric acid of this invention which will preferably contain from about 17.5 to about 35 parts of water per 100 parts dichloroisocyanuric acid (dry basis).

As illustrative of the water-wet dichloroisocyanuric acid and the preparation thereof is the following:

Example A

An aqueous slurry of disodium isocyanurate was prepared by dissolving 1000 parts of isocyanuric acid in 11,500 parts of water to which had been added 1272 parts of 50% caustic soda with stirring. The resulting slurry had a pH of 13.5. Two-hundred and fifty parts of this slurry were charged to a jacketed chlorination vessel provided with two six-bladed turbine propellers, the product therein being drawn off through a tube having an opening about 18 inches above the bottom of the vessel. The slurry of disodium cyanurate was cooled to a temperature of 10° C. by circulating brine at a temperature of −25° C. through the jacket of the vessel. The slurry in the vessel was then chlorinated by passing gaseous chlorine through a tube in the bottom of the vessel into the slurry at a point just below the bottom agitator propeller with the propeller operating at 1050 r.p.m. equivalent to a peripheral speed of 1180 feet per minute, the chlorine being supplied at a rate sufficient to maintain the temperature of the slurry at substantially 38° C. with brine at −25° C. circulating through the cooling jacket. The introduction of chlorine and the mechanical dispersion thereof through the slurry was continued until the pH of the slurry was between 1.9 and 2.1. The resulting product was an aqueous slurry comprising dichloroisocyanuric acid in an aqueous medium containing sodium chloride, chlorine and disodium isocyanurate. The remainder of the disodium isocyanurate slurry (13,520 parts) was cooled to 25.° C. and metered into the above described slurry in the chlorinating vessel through a tube opening into the lower part of the vessel below the lowest turbine propeller at a rate of 11 parts per minute with continuous agitation at the propeller speed described above, and gaseous chlorine was concurrently continuously introduced into the slurry at the rate of 0.98 part per minute (corresponding approximately to a 7% excess of chlorine on the basis of disodium cyanurate). Under the conditions of agitation and dispersion of the chlorine through the slurry, the pH of the slurry was maintained between 1.9 and 2.1. The temperature of the slurry was maintained at substantially 38° C. by passing cooling brine at −25° through the jacket of the vessel. A portion of the slurry in the vessel was continuously pumped from the vessel through the withdrawal tube at the rate of 12 parts per minute, thus maintaining a substantially constant volume of heel slurry in the vessel consisting of a weight of slurry of 600 parts. The slurry removed from the vessel was continuously dewatered in a centrifuge to a water content of less than 40% by weight based on the dry centrifuge cake. When the cake had built up to the capacity of the centrifuge, the slurry removed from the vessel was diverted to another centrifuge and the cake in the first centrifuge was dewatered until it contained about 25% by weight of moisture. The cake which consisted essentially of dichlorocyanuric acid and water was washed with water to remove sodium chloride and then further dewatered by centrifugation to provide a cake containing 80% dichloroisocyanuric acid and 20% water.

As illustrative of various methods of recovering dichloroisocyanuric acid from the filter cake of Example A above and compositions obtained therefrom is the following:

Example I

To 150 grams of the filter cake of Example A, which contains 120 grams of dichloroisocyanuric acid and 30 grams of water, at room temperature is added and intimately mixed 300 grams of powdered sodium tripolyphosphate for about 10 minutes employing a rotary blender operating at about 80 r.p.m. At the end of the said mixing time a dry powderlike free-flowing material is obtained composed of dichloroisocyanuric acid, the mono- and dihydrates of sodium dichloroisocyanurate, sodium acid tripolyphosphate (i.e. $Na_4HP_3O_{10}$) sodium tripolyphosphate and the hexahydrate of sodium tripolyphosphate. Theoretically, (i.e. assuming the available chlorine content of dichloroisocyanuric acid of the wet-cake is 71.6%) this mixture should have an available chlorine content of 19.1% and upon analysis is found to have an available chlorine content of 19.05%. The product contains 6.7% by weight of water of hydration. An aqueous solution of this product is slightly basic.

Example II

To 150 grams of the filter cake of Example A, which contains 120 grams of dichloroisocyanuric acid and 30 grams of water, and at room temperature is added and intimately mixed 250 grams of powdered sodium tripolyphosphate for about 15 minutes employing a rotary blender operating at about 65 r.p.m. At the end of the said mixing time a dry powderlike free-flowing material is obtained composed of dichloroisocyanuric acid, the mono- and dihydrates of sodium dichloroisocyanurate, sodium acid tripolyphosphate (i.e. $Na_4HP_3O_{10}$) sodium tripolyphosphate and the hexahydrate of sodium tripolyphosphate. Theoretically this mixture should have an available chlorine content of 21.5% and upon analysis is found to have an available chlorine content of 21.4%. The product contains 7.5% by weight of water of hydration.

Example III

To 300 grams of the filter cake of Example A, which contains 240 grams of dichloroisocyanuric acid and 60 grams of water, and at room temperature is added and intimately mixed 400 grams sodium tripolyphosphate for about 15 minutes employing a rotary blender operating at about 80 r.p.m. At the end of the said mixing time a dry powderlike free-flowing material is obtained composed of dichloroisocyanuric acid, the mono- and dihydrates of sodium dichloroisocyanurate, sodium acid tripolyphosphate (i.e. $Na_4HP_3O_{10}$) sodium tripolyphosphate and the hexahydrate of sodium tripolyphosphate. Theoretically this mixture should have an available chlorine content of 24.5% and upon analysis is found to have an available chlorine content of 24.6%. The product contains 8.6% by weight water of hydration.

Example IV

To 200 grams of the filter cake of Example A, which contains 160 grams of dichloroisocyanuric acid and 40 grams of water, and at room temperature is added and intimately mixed 200 grams of powdered sodium tripolyphosphate for about 20 minutes employing a rotary blender operating at about 60 r.p.m. At the end of the said mixing time a dry powderlike free-flowing material is obtained composed of dichloroisocyanuric acid, the mono- and dihydrates of sodium dichloroisocyanurate, sodium acid tripolyphosphate (i.e. $Na_4HP_3O_{10}$) and the hexahydrate of sodium tripolyphosphate. Theoretically, this mixture should have an available chlorine content of 28.6% and upon analysis is found to have an available chlorine content of 28.3%. The product contains 10.0% by weight water of hydration.

Example V

To 200 grams of the filter cake of Example A, which contains 160 grams of dichloroisocyanuric acid and 40 grams of water, and at room temperature is added and intimately mixed 150 grams of powdered sodium tripolyphosphate for about 20 minutes employing a rotary blender operating at about 70 r.p.m. At the end of the said mixing time a dry powderlike free-flowing material is obtained composed of dichloroisocyanuric acid, the mono- and dihydrates of sodium dichloroisocyanurate, sodium acid tripolyphosphate (i.e. $Na_4HP_3O_{10}$) and the hexahydate of sodium tripolyphosphate. Theoretically this mixture should have an available chlorine content of 32.4% and upon analysis is found to have an available chlorine content of 32.5%. This product contains 11.4% by weight water of hydration. An aqueous solution of this product is slightly acidic.

Samples of the respective Examples I through V are placed in sealed jars and stored at room temperature for two months and then analyzed for available chlorine. The results are as follows.

| Example: | Percent available chlorine |
|---|---|
| I | 19.1 |
| II | 21.3 |
| III | 24.6 |
| IV | 28.3 |
| V | 32.5 |

These samples so stored showed no signs of caking and readily dissolved in water to provide clear slightly acidic to slightly basic solutions.

As above set forth in Examples I to V, inclusive, substantially no dichloroisocyanuric acid was lost in recovering same from the water-wet centrifuge cake of Example A. In contrast a portion of the said wet-cake on drying at about 150° C. in an air circulating oven for approximately 2.33 hours resulted in a lowering of the available chlorine content of the dichloroisocyanuric acid product of approximately 3.5%.

The sodium tripolyphosphate, i.e. $Na_5P_3O_{10}$, useful in this invention is an article of commerce and contains less than 1% by weight of water. This salt exists in two forms designated as $Na_5P_3O_{10}I$ and $Na_5P_3O_{10}II$ as described in volume 63, Journal of the American Chemical Society, pp. 461–462. In this invention either form can be used or any mixture thereof. It is preferably used in powdered form, i.e. a particle size of which 90% or more will pass through 100 mesh.

While it is preferred to mix sodium tripolyphosphate with water-wet dichloroisocyanuric acid at about room temperature, temperatures in the range of about 10° C. to about 40° C. can be employed. In the mixing operation due to the heat of hydration, there is a slight increase in temperature, e.g. of about 1 to 5° C. increase.

With respect to the mixing the sodium tripolyphosphate and water-wet dichloroisocyanuric acid, any means can be employed which permits intimate contact therebetween.

While as aforenoted the amounts of sodium tripolyphosphate and water-wet dichloroisocyanuric acid may vary it is preferred that they be so varied to obtain an ultimate dry powdered product containing not more than 20% by weight of water, actually water of hydration.

As to the dry powdered product obtained in accordance with the process of the invention the amount of sodium as sodium dichloroisocyanurate and the amount of sodium as sodium acid tripolyphosphate will be equal. In general, the total amount of sodium dichloroisocyanurate and sodium acid tripolyphosphate in the final product will be in the range of about 2% to about 50% by weight of the total composition.

What is claimed is:

1. The process which comprises intimately mixing powdered sodium tripolyphosphate with water wet dichloroisocyanuric acid, as sole ingredients, at a temperature in the range of about 10° C. to about 45° C. until a dry free-flowing product is obtained, said water wet dichloroisocyanuric acid being the water wet precipitate of dichloroisocyanuric acid obtained by preparing dichloroisocyanuric acid in an aqueous medium from appropriate reagents and using the dichloroisocyanuric acid prior to subjecting it to a drying operation, the amount of sodium tripolyphosphate used being in the range of about 6 to about 500 parts by weight, per unit weight of water in the water wet dichloroisocyanuric acid, said water wet dichloroisocyanuric acid containing from about 10 to about 65 parts by weight of water per 100 parts by weight of dichloroisocyanuric acid on a dry basis.

2. The process which comprises intimately mixing a water wet substantially pure dichloroisocyanuric acid containing from about 17.5 to about 35 parts by weight of water per 100 parts by weight of dichloroisocyanuric acid on a dry basis with powdered sodium tripolyphosphate containing less than 1% by weight of water, as the sole ingredients, at a temperature in the range of about 10° C. to about 45° C. until a dry, free-flowing product is obtained, said water wet dichloroisocyanuric acid having been prepared in an aqueous medium from appropriate reagents and used without subjecting it to a drying operation, the amount of sodium tripolyphosphate used being in the range of about 10 to about 100 parts by weight per unit weight of water in said water wet dichloroisocyanuric acid.

References Cited in the file of this patent
UNITED STATES PATENTS

| 1,988,991 | Albertshauser | Jan. 22, 1935 |
| 2,145,015 | Seaton | Jan. 24, 1939 |
| 2,195,757 | Robson et al. | Apr. 2, 1940 |
| 2,578,270 | Strain | Dec. 11, 1951 |
| 2,590,794 | Robson | Mar. 25, 1952 |
| 2,607,738 | Hardy | Aug. 19, 1952 |
| 2,695,274 | MacMahon | Nov. 23, 1954 |
| 2,795,556 | Quinn | June 11, 1957 |
| 2,815,311 | Ellis | Dec. 3, 1957 |
| 2,913,460 | Brown et al. | Nov. 17, 1959 |
| 2,921,911 | Staubly et al. | Jan. 19, 1960 |

FOREIGN PATENTS

| 551,308 | Belgium | Mar. 26, 1957 |
| 219,930 | Australia | Jan. 22, 1957 |